(12) United States Patent
Hassan et al.

(10) Patent No.: US 8,805,427 B2
(45) Date of Patent: Aug. 12, 2014

(54) CHANNEL REUSE WITH COGNITIVE LOW INTERFERENCE SIGNALS

(75) Inventors: Amer A. Hassan, Kirkland, WA (US); Pierre de Vries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 661 days.

(21) Appl. No.: 12/271,454

(22) Filed: Nov. 14, 2008

(65) Prior Publication Data

US 2010/0124940 A1 May 20, 2010

(51) Int. Cl.
*H04B 7/00* (2006.01)
(52) U.S. Cl.
USPC ........... 455/509; 455/447; 455/450; 455/454; 455/464; 455/102
(58) Field of Classification Search
CPC . H04L 1/0003; H04L 1/1893; H04L 27/3488; H04L 1/0009; H04L 1/1819; H04L 1/1845; H04L 1/1867; H04L 2001/0098; H04L 27/0006; H04L 27/0008; H04L 27/04; H04L 27/206; H04L 27/34; H04L 27/3416; H04W 16/14; H04W 72/08; H04W 88/06; H04B 7/0634
See application file for complete search history.

(56) References Cited

U.S. PATENT DOCUMENTS

| 6,639,904 B1 | 10/2003 | Boyer et al. |
| 7,363,008 B2 | 4/2008 | Hassan |
| 2002/0002052 A1 * | 1/2002 | McHenry ...................... 455/447 |
| 2002/0015477 A1 | 2/2002 | Geile et al. |
| 2002/0028680 A1 * | 3/2002 | Jenkins et al. ................ 455/454 |

(Continued)

FOREIGN PATENT DOCUMENTS

| JP | 20050278052 A1 | 10/2005 |
| JP | 20070214819 A1 | 8/2007 |

(Continued)

OTHER PUBLICATIONS

Sharma, G. et al., "Performance Evaluation of Burst-Error-Correcting Codes on a Gilbert-Elliott Channel," IEEE Transactions on Communications, vol. 46, No. 7, Jul. 1998.

(Continued)

*Primary Examiner* — Yuwen Pan
*Assistant Examiner* — Fanghwa Wang
(74) *Attorney, Agent, or Firm* — John Jardine; Andrew Sanders; Micky Minhas

(57) ABSTRACT

A computing system in which devices communicate wirelessly as secondary users in a band assigned to primary users. The computers communicate using new signals developed to reduce disruption to primary users of the band. The new signals may be produced by sensing, or otherwise determining, signals used by primary users and developing signals using a modulation scheme or other signal parameters that provides little disruption to primary users. These techniques make available to users unused and/or underused portions of the radio spectrum, such as whitespaces between television channels. The new signals may be generated by software defined radios within the computing devices or by switching between modulation schemes supported by conventional wireless network interface card.

17 Claims, 11 Drawing Sheets

(56) References Cited

U.S. PATENT DOCUMENTS

| | | | |
|---|---|---|---|
| 2003/0118123 A1* | 6/2003 | Hudson et al. | 375/295 |
| 2005/0058153 A1 | 3/2005 | Santhoff | |
| 2005/0097425 A1* | 5/2005 | Golitschek et al. | 714/749 |
| 2005/0185727 A1* | 8/2005 | Tanaka et al. | 375/261 |
| 2006/0067354 A1 | 3/2006 | Waltho et al. | |
| 2007/0220576 A1 | 9/2007 | Rouhana | |
| 2008/0198948 A1 | 8/2008 | Tang | |
| 2008/0207136 A1 | 8/2008 | Tang | |
| 2008/0207248 A1 | 8/2008 | Tang | |
| 2008/0240270 A1 | 10/2008 | Coon | |
| 2008/0242233 A1* | 10/2008 | Akita et al. | 455/68 |
| 2008/0293353 A1 | 11/2008 | Mody et al. | |

FOREIGN PATENT DOCUMENTS

| | | |
|---|---|---|
| JP | 20080072646 A1 | 3/2008 |
| WO | WO2008107854 A1 | 9/2008 |
| WO | 2009050588 A1 | 4/2009 |

OTHER PUBLICATIONS

Sahin, M. et al., "System Design for Cognitive Radio Communications," http://wcsp.eng.usf.edu/papers/Mustafa_papers/System_Design_for_CR.pdf, retrieved Oct. 7, 2008.

Zhang, Q., "Ad-hoc Adaptive Freeband (AAF)," University of Twente, The Netherlands, Oct. 4, 2008, http://wwwhome.cs.utwente.nl/~zhangqi/.

Cabric, Danijela et al., "A Cognitive Radio Approach for Usage of Virtual Unlicensed Spectrum", In Proc. of 14th IST Mobile Wireless Communications Summit 2005, Dresden Germany, Jun. 2005, 4 pages unnumbered.

International Search Report and Written Opinion for International Application No. PCT/US2009/064575 mailed Jul. 6, 2010.

Douo Koike, Japanese Office Action, Application # 2011-536556, Jun. 10, 2013.

\* cited by examiner

CHANNEL REUSE WITH COGNITIVE LOW INTERFERENCE SIGNALS

BACKGROUND

Wireless transmissions are used for wireless networking among computing devices as well as in other settings, such as to support broadcast of radio and television content. To avoid interference between the signals of different users, different portions of the full spectrum available for wireless communication are allocated to different uses.

The radio spectrum has been divided administratively into two primary sectors: the licensed spectrum and the unlicensed spectrum. The licensed spectrum consists of frequencies that have been licensed to organizations, such as commercial broadcasters, for exclusive use by those organizations. For example, a portion of the spectrum (also known as a "frequency band," "band," or "channel") may be licensed to a cellular communications company for use in communicating information representing voice and data calls placed by its subscribers, or licensed to a media broadcaster to transmit signals carrying audio and video data representing television content. The unlicensed spectrum, on the other hand, has been allocated for free use by the public—though, typically, use of the unlicensed spectrum requires operating in accordance with some regulations, such as maximum power output regulations, that are designed to minimize interference between users.

The radio spectrum may be considered, however, to have a third spectrum sector: unused portions of the licensed spectrum. These unused portions may be categorized into several types. First, a frequency band may be licensed by an organization, but the organization may not be using the band at a given time, because the organization is not using the portion at any time or uses it intermittently. Thus, a first type of unused portion is a licensed band that is not in use or is underused, at a given time. Second, when frequency bands of the licensed spectrum are assigned to organizations, typically they are not assigned exactly consecutively; instead, there may be gaps between the licensed portions to prevent two organizations from interfering with one another. In a simplified example, if a section of licensed spectrum having a bandwidth of 50 MHz between 300 MHz and 350 MHz is to be divided between two organizations, the 300-320 MHz band may be granted to the first organization and the 330-350 MHz band granted to the second organization, with the 320-330 MHz band left unallocated. The unassigned band of the licensed spectrum, referred to as "whitespace," is designed to provide a buffer between the two transmissions that minimizes the risk of a signal from the first organization interfering with transmission of a signal from the second organization. These whitespaces may be considered allocated in that they are located in a part of the spectrum allocated to television use, but unassigned in that they are not designated for use by a particular entity. Whitespaces are a second type of unused portion of the licensed spectrum.

Recently, it has been proposed that unused portions of the licensed spectrum may be used by unlicensed transmitters—acting as secondary users, where the licensee of the unused portion or of an adjacent channel is a primary user—as if the unused portions were a part of the unlicensed spectrum. Such use of the whitespace, however, is predicated on using techniques that prevent the newly transmitted signals (i.e., those signals transmitted by a secondary user) from interfering with transmission of existing signals associated with the licensees of the bands being used or the nearby bands (i.e., those signals which are being or will be transmitted by the primary user).

One class of techniques for preventing interference is referred to as Detect and Avoid (DAA), and has been implemented by some communication technologies such as the Ultra Wideband (UWB) protocol. In DAA techniques, a channel over which a transmitter desires to send information is monitored to determine whether data is being transmitted over the channel or if data is being transmitted in another channel that is close enough that interference is likely. Then, in accordance with the Detect and Avoid protocol, if communication is detected in the channel during the monitoring, the channel is avoided or only low-power transmissions are permitted. Using DAA techniques in this way prevents a new signal from being transmitted at the same time in the same channel as an existing signal—or over a second adjacent channel—and thus minimizes the risk that the new signal will interfere with transmission of the existing signal.

In whitespace, DAA techniques may be performed to detect signals from adjacent allocated frequency bands to determine whether transmission in the whitespace would interfere with existing signals in the adjacent frequency bands. If any existing signal from the adjacent bands is detected, then the whitespace may be avoided to prevent interference with the existing signal, or a transmission power may be lowered. In channels that have been licensed to an organization but are potentially unused, DAA techniques may be performed to detect existing signals from the licensing organization that may be present in the channel. If an existing signal is detected, then the channel may be avoided.

SUMMARY

Applicants have recognized and appreciated that more of the frequency spectrum may be available for wireless communication, and particularly wireless communication for computer networks, if wireless devices develop new signals that can be used concurrently with existing signals in the same channels or adjacent channels. The new signals may be developed based on the effect such new signals may have on the ability of devices to extract information from existing signals in the same or adjacent channels. As a result, a greater spectrum is available for wireless communication. For example, computer networks, whether wireless local area networks (WLANs), or larger wireless wide area networks (WWANs) and wireless regional area networks (WRANs), may transmit within what would otherwise be unused communication capacity in a licensed spectrum.

Appropriate new signal formats may be developed by selecting signal characteristics that provide a low correlation between the new and the existing signals over the interval in which information is being communicated in the existing signal. These characteristics that are selected may relate to the manner in which information is modulated in the new signal, such as the constellation used to represent symbols in the new signal or a code sequence used to generate a signal for CDMA communication. By appropriately selecting such characteristics of the new signal, the new signal does not disrupt the manner or effectiveness with which a receiver demodulates and extracts information from an existing signal.

It should be appreciated that the foregoing is intended to be a non-limiting summary of the invention, which is defined only by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
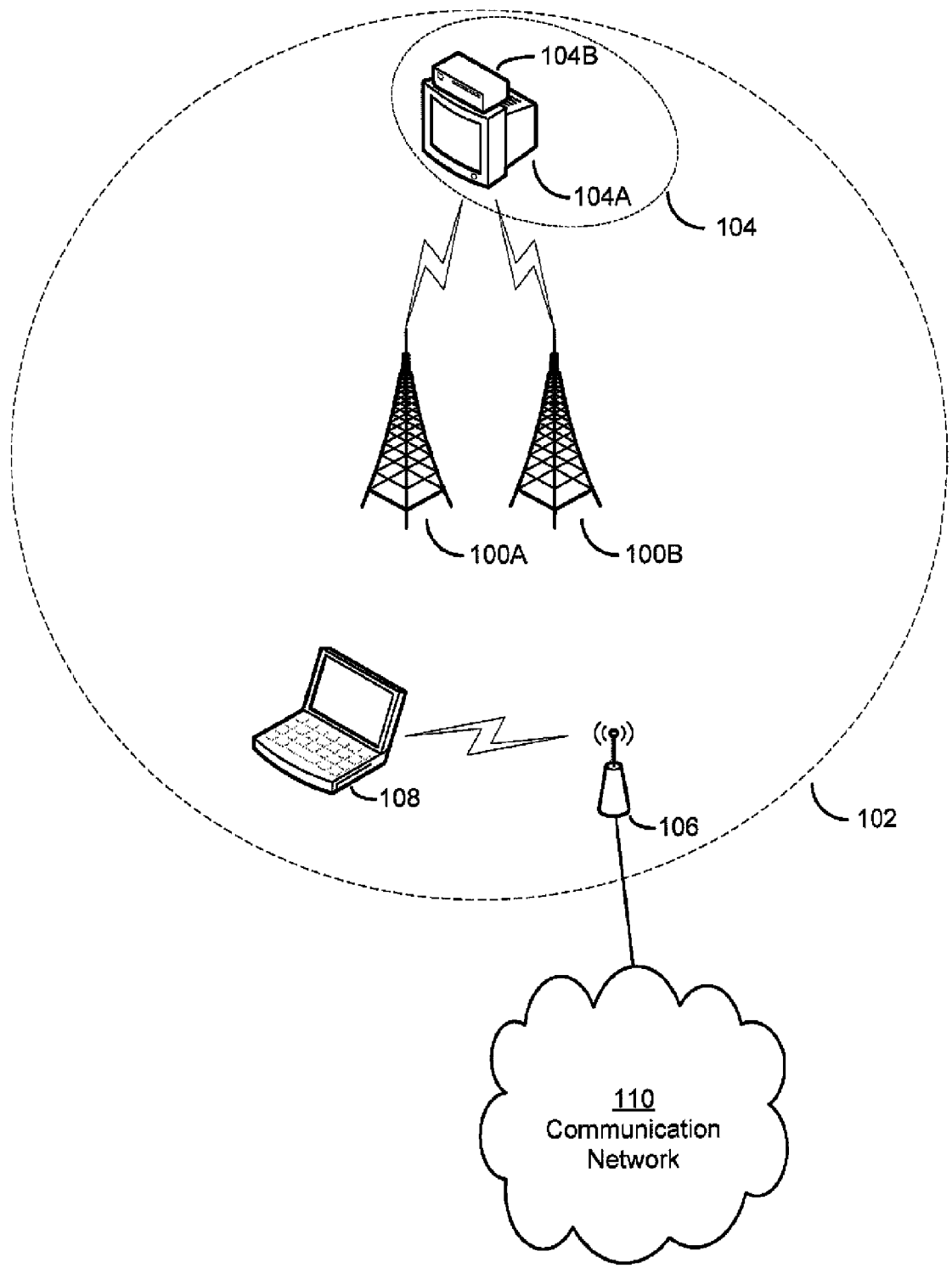
FIG. 1 is an illustration of an exemplary system in which techniques in accordance with some of the principles described herein may operate.

Applicants have recognized and appreciated that existing techniques for sharing a frequency spectrum, like Detect and Avoid (DAA), are either not effective at allowing a secondary user to use a channel in a licensed band that is reserved for a primary user, or do not provide a desired level of access to the licensed band for secondary users.

Further, Applicants have recognized and appreciated that improved approaches to avoid disruption to primary users will likely be required to persuade administrative agencies that regulate wireless transmissions—such as the Federal Communication Commission (FCC) of the United States—to permit transmission of data by secondary users, even in unused or underused portions of the licensed spectrum.

Applicants have recognized and appreciated that improved techniques for preventing interference may be implemented by developing new signals to be transmitted by a secondary user based on the impact such new signals have on receipt of information conveyed in an existing signal transmitted by a primary user. In accordance with the improved techniques, when a receiver adapted to process the existing signal receives the new signal, the new signal does not corrupt data of an existing signal, supplant data in the existing signal, or otherwise interfere with operation of the equipment intended to receive the existing signal.

Applicants have recognized that it is possible to predict whether a new signal will disrupt an existing signal by analyzing either a sampling of the existing signal, the nature of licensed use within a channel, and/or characteristics of a receiver at a destination of the existing signal. Various embodiments may employ one or more of these techniques, or other suitable techniques to identify whether a new signal is likely to be recognized and processed as data by a receiver of existing signals. If a new signal is recognized and processed as data, the new signal may disrupt the existing signal by, for example, corrupting the data in the existing signal. Embodiments of the invention may, based on the properties and parameters of the receiver of the existing signals, appropriately select a signal to provide low disruption and low likelihood of the receiver altering its determination of data in an existing signal based on the new signal. (It should be appreciated that reference to a "receiver" or "destination" herein refers to the receiver or destination of the existing signals unless otherwise noted.)

Techniques such as these may be used, in some environments, to transmit new signals by unlicensed users within the licensed band of the radio spectrum, with reduced concern that the new signals will disrupt the existing, licensed communications. Because the characteristics of the primary, existing signals in a licensed band change infrequently, it may be possible to develop a new, secondary signal based on information about signals used by primary users of the licensed band obtained at a time other than when the secondary signal is used. For example, information about the primary user of a band may be provisioned in a wireless device in advance of use of the secondary signal. Alternatively, for a mobile computing device, such as a portable PC or a smart mobile phone, the device may move in and out of areas in which it can effectively receive the primary signal. Characteristics of the primary signal determined at one time may be used to generate a secondary signal at another time. Thus, even in the cases where detection of the existing signals is difficult or impossible, interference with devices for receiving a primary signal of a channel may be avoided.

The techniques described above may be used to permit a secondary user to transmit new signals in a channel of the licensed spectrum that may be used to transmit existing signals. These techniques may also be desirable in transmitting data in the unlicensed portion of the spectrum. As described briefly above, transmission in the unlicensed spectrum by a transmitter is permitted so long as it is done in accordance with several regulations, typically including that the transmissions do not interfere with transmission of existing signals by other transmitters. However, as above, conventional techniques may not cure the disruption problem; any new signal may disrupt existing signals. By examining existing signals in a channel of the unlicensed frequency spectrum and determining the properties and parameters of receipt procedures for destinations of the existing signals, a transmitter may be able to determine whether a new signal will alter the data deemed to have been received by a receiver of the existing signals. If the new signal will alter that data, then it may not be transmitted. Additionally or alternatively, a transmitter may be enabled to produce a new signal that will not alter the data output by a receiver of the existing signals. In this way, transmissions in the unlicensed spectrum may also be improved.

As discussed in further detail below, techniques operating in accordance with some or all of the principles described herein may be implemented in any suitable computing device using any suitable wireless radio components. In various examples given below a laptop personal computer or wireless access point is used as an example of a computing device seeking to transmit a new signal in a way that will not be recognized and decoded by a receiver of an existing signal. It should be appreciated, however, that a transmitter or receiver of new signals may be any suitable computing device performing wireless communications, as embodiments of the invention are not limited to operating with any particular device(s). Further, the computing device may comprise any suitable type or types of wireless radio components which implement any suitable radio functions in hardware and/or software. Accordingly, radio operations may be carried out entirely in hardware using any suitable conventional technique, entirely in software using any suitable software-defined radio (SDR) technique, or any suitable combination of hardware and software, as embodiments of the invention are not limited in the manner in which wireless radio signals are generated.

Further, it should be appreciated that techniques operating in accordance with some or all of the principles described herein may operate in any suitable environment and transmit data for any suitable purpose. Accordingly, existing signals in an environment may be any suitable signal transmitted between a source and a destination, including between two computing devices or between a broadcaster and a receiver. In various examples below, the existing signals are described as television signals, but it should be appreciated that this is merely an example provided for context, and that embodiments of the invention are not limited to transmitting in an environment comprising television signals nor are they limited to transmitting in such a way as to prevent interference with receipt of television signals. Additionally, it should be appreciated that a computing device may transmit new signals for any suitable purpose. In various examples given below, the computing device may be described as transmitting signals relating to a Wireless Regional Area Network (WRAN), but it should be appreciated that this is just one example provided for context and that any suitable data and/or signals may be transmitted by a computing device.

For clarity, some of the examples described herein are explained in the context of "existing signals" and "new signals," and techniques are implemented that prevent disruption of receipt of the existing signals when a new signal is transmitted. It should be appreciated, however, that these examples are merely illustrative of the various systems and contexts in which some embodiments of the invention may operate. In some contexts, a "new" signal may have been transmitted for a much longer time than an "existing" signal. Rather, as used herein, an "existing signal" may be any signal that was transmitted, is being transmitted, or will be transmitted by a primary user of a channel, and may also be called a primary signal. The primary user may be any party that has reserved the channel or been granted permission to use the channel in some other manner, such as a licensee of the channel. A "new signal" is any signal transmitted by a secondary user of the channel, and may also be called a secondary signal. A secondary user may be any party, other than the primary user, that is using the channel (or an adjacent channel, such as whitespace next to a channel). As a specific example, a primary user may be a television broadcaster that has permission from a government or other administrative body to use a portion of a licensed frequency spectrum for transmitting television signals, and the existing signals may be any signals that were transmitted, are being transmitted, or will be transmitted in the particular frequency band by the television broadcaster. In accordance with the examples below, a secondary user may be any computing device associated with a WRAN operating in or near the particular frequency band (i.e., in the frequency band or in adjacent whitespace), including a communications device or wireless access point, and any signals associated with the WRAN may be new signals.

Accordingly, it should be appreciated that, in some contexts, the "existing signal" may not be transmitted at all, but may instead be a signal that may be transmitted at any time in the future—or was transmitted at any time in the past—by a primary user, and should be further appreciated that order of generation need not be a factor when determining which signal is a "new signal" and which is an "existing signal."

Further, any channel of the radio spectrum may be used for transmission by a computing device to transmit a new signal. In various examples described below, the new signals could be transmitted over an unused portion of the radio spectrum, and the unused portion may be described as whitespace between television channels of the licensed spectrum. It should be appreciated, however, that any suitable channel in any suitable portion of the radio spectrum can be used, including channels in the licensed or unlicensed spectra and including whitespace or channels overlapping with those used by primary users. It should be further appreciated that whitespaces between television channels are merely one example of types of unused portions, and that any suitable unused portion may be used as a channel to transmit new signals. Further, it should be appreciated that, as discussed above, embodiments of the invention are not limited to operating with unused portions of the licensed spectrum, but instead may operate on any suitable channel, allocated or unallocated, that may be used by primary users and secondary users, as embodiments of the invention are not limited to operating with any particular channel or type of channel.

Several illustrative implementations will now be described. However, these are merely examples as the aspects of the present invention described herein are not limited to these or any other specific implementations.

FIG. 1 shows an exemplary environment in which some embodiments of the invention may act. The environment of FIG. 1 includes at least two broadcasting antennas 100A and 100B, each transmitting signals in a frequency channel. These antennas may be transmitting signals for any suitable purpose. In some implementations, they may be associated with organizations, such as commercial broadcasters that have been allocated space in the licensed frequency spectrum by the FCC or other administrative agency. For example, antenna 100A may be associated with a television broadcaster transmitting signals in a first channel, and antenna 100B may be associated with a television broadcaster transmitting signals in a second channel. It should be appreciated, however, that a television broadcaster is only one example of the types of organizations with which the antennas 100A and 100B may be affiliated, and that antennas may transmit any suitable signals in any suitable manner for any suitable purpose.

For simplicity, in the example of FIG. 1 both antennas 100A and 100B can be considered to have the same service area (the area in which transmitted signals may be received), shown in FIG. 1 as the dotted circle 102, though in practice the service areas may not be the same. Within the service area 102 is a destination 104 of the signals transmitted by the antennas 100A and 100B. In FIG. 1, the destination is shown as a television 104A with a set-top box (STB) 104B. The television 104A and/or STB 104B may receive the signals transmitted by the antennas 100A and 100B, process them in any of various ways to disregard undesired content, and display the desired content on the television 104A. For example, an antenna of the television 104A or STB 104B may receive a "received signal" that may comprise the signals transmitted by each of antennas 100A and 100B. When a user tunes the television 104A to a particular channel—such as the channel associated with antenna 100A—the receiver 104 may run the received signal through a receipt procedure to process and attempt to decode only signal content associated with the signal from antenna 100A. This receipt procedure may then yield the signal transmitted by antenna 100A, and it may be displayed on the television 104A.

Figure 2:
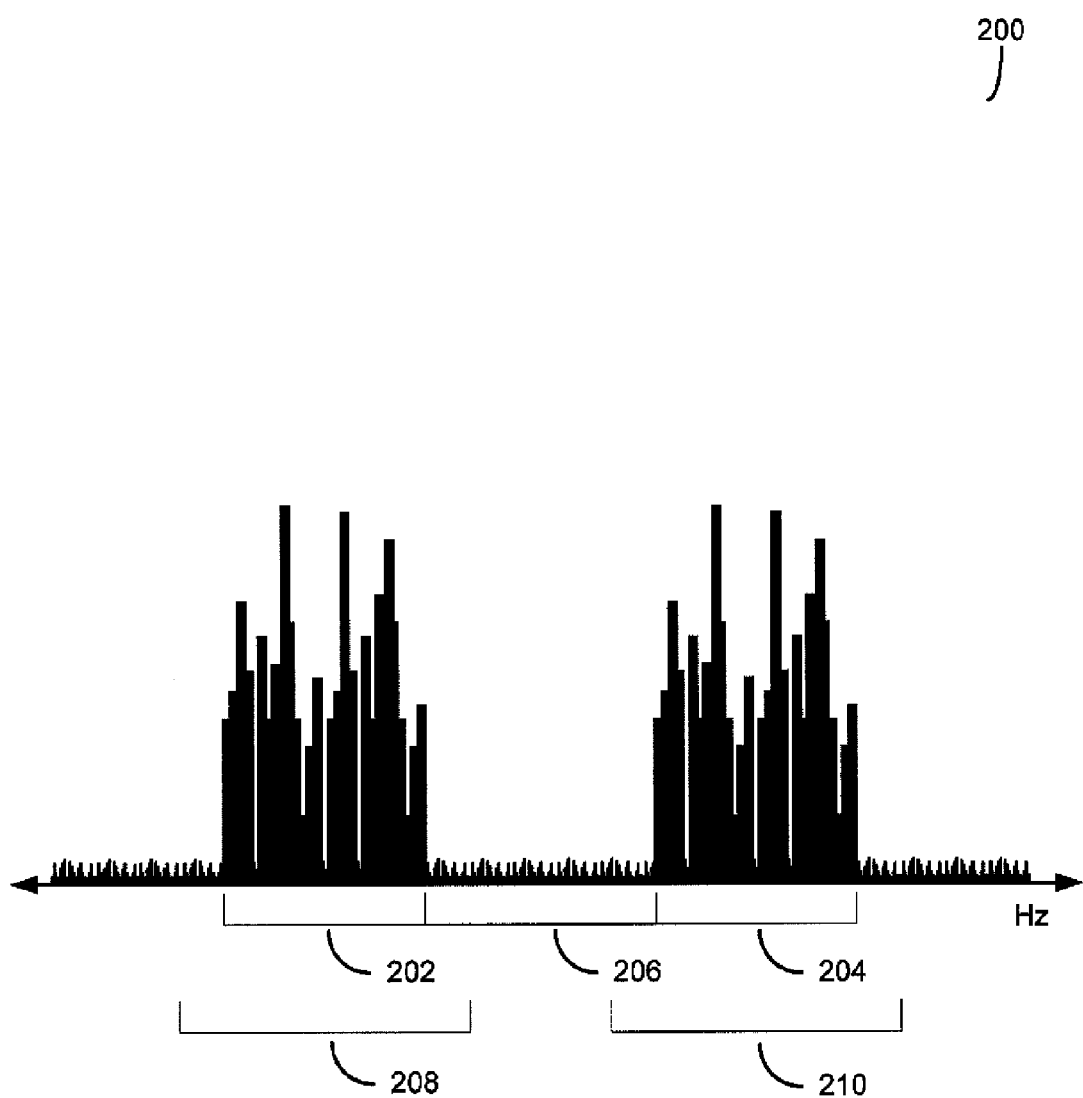
FIG. 2 is a graph of two signals in the frequency domain showing two channels on which the signals are being transmitted with a whitespace therebetween.

A graph of received signal power versus frequency illustrating an exemplary received signal is shown in FIG. 2. Graph 200 shows an analysis of a received signal in the frequency domain, and shows the values associated with each signal frequency included in the received signal. Across the spectrum there may be a minimal amount of "noise" in the signal, shown as small power values across the graph. A received signal may also include data transmitted on various channels, and an analysis of such a signal in the frequency domain will show larger power values in the frequencies carrying that data. Graph 200 shows two such regions 202 and 204. In the context of FIG. 1, these channels 202 and 204 may be respectively associated with the channels on which antennas 100A and 100B of FIG. 1 are transmitting. When performing a receipt procedure to yield desired data—such as the television content transmitted by antenna 100A—a receiver may attempt to remove all values associated with frequencies that are not in the desired channel. Accordingly, in the example of FIG. 1, the receiver 104 may only interpret signal content associated with the channel 202 as data, and may disregard all other signal content.

As discussed above, administrative agencies such as the FCC that license channels of the licensed radio spectrum to organizations such as commercial broadcasters typically do not assign these channels precisely consecutively. These whitespaces, shown in FIG. 2 as the whitespace channel 206, are created to make the receipt procedures performed by destinations such as receiver 104 easier, because they do not have to be designed to process or disregard signal content at the precise edge of a channel—a difficult task. Instead, because of the slight buffer between channels, the primary users are able to design receipt procedures that decode portions of the whitespace in addition to the channels 202 and 204. The processing boundaries of an exemplary receipt procedure are shown as boundaries 208 and 210.

As discussed above, it has been appreciated that portions of the wireless spectrum could become available if secondary users could transmit in the whitespace without disrupting existing signals or requiring changes to receiver 104. Applicants have appreciated that even greater use of the spectrum could be facilitated if secondary users could use the assigned channels 202 and 204 without disrupting the primary users.

Techniques operating according to some of the principles described herein may be used to transmit data in these whitespaces, any other unused portions of the radio spectrum, or, in some embodiments, channels assigned to a primary user. In the example of FIG. 1, within the service area 102 there may also be a wireless access point 106 and a computing device 108 that are seeking to exchange data wirelessly using the whitespace. Because the receipt procedure for the receiver 104 may be impacted by signals in portions of the whitespace, however, there is a risk that access point 106 and computing device 108 will disrupt communication in the existing signals in the channels 202 and 204 if they use the whitespace. Computing devices seeking to transmit new signals in the whitespace therefore need to ensure that their new signals will not alter the results of receivers extracting data from existing signals, which could cause data loss. In accordance with various techniques described herein, the wireless access point 106 may be adapted to analyze the environment in which it is transmitting to develop a signal with which it can transmit data to the computing device 108 without disrupting receipt of data in the signals transmitted by the antennas 100A or 100B.

Figure 3:
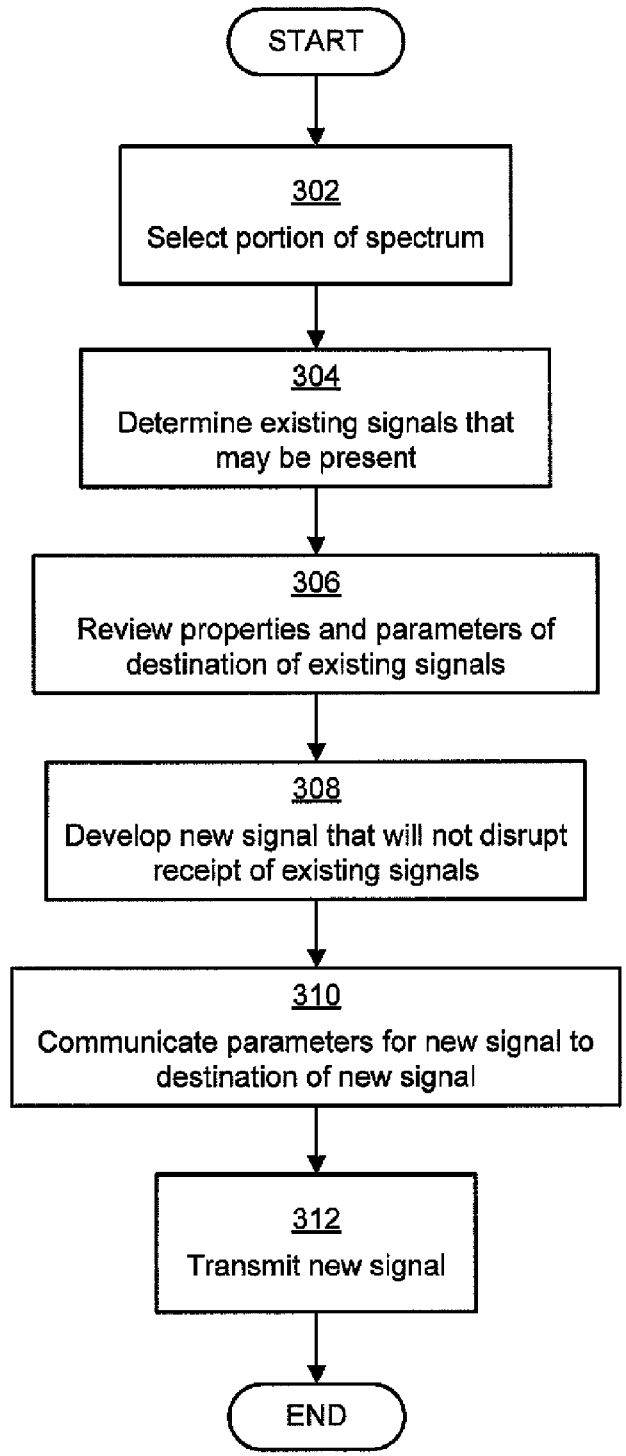
FIG. 3 is a flowchart of a process for determining parameters of a new signal that may be transmitted without disrupting receipt of one or more existing signals, that may be implemented in accordance with some of the principles described herein.

FIG. 3 shows one example of such a process that may be used to develop a signal with which to transmit data in a frequency channel without disrupting receipt of existing signals transmitted by any other users of the channel or nearby channels. In this example, the channel is one in the licensed band. Also, in this example, the process is employed by a secondary user to transmit new signals in a whitespace between channels in use by primary users of the licensed band. It should be appreciated, though, that the process 300 shown in FIG. 3 is merely exemplary of the types of processes that may be implemented in accordance with some of the principles described herein. Further, it should be appreciated that while the process 300 will be described in the context of the environment illustrated in FIG. 1, the process 300 may be implemented in any suitable environment.

The process of FIG. 3 may be carried out at any suitable time. For example, the process 300 may be carried out to select a channel and develop a new signal based on existing signals in the channel prior to each transmission. This may be done in some environments or for some channels where, for example, transmission characteristics of existing signals are changing frequently. In another example, however, the process 300 may be carried out less frequently, such as each time computing device 108 establishes a communication session with wireless access point 106 (e.g., when computing device 108 associates with wireless access point 106). This may be done in some environments or for some channels where transmission characteristics of existing signals are changing infrequently.

The process 300 begins in block 302, in which the wireless access point 106 selects a channel of the spectrum. In this example, wireless access point 106 locates an unused portion of spectrum, though any other suitable channel may be selected. The selection may be made in any suitable manner, such as by consulting a listing of known unused portions of a spectrum, such as a listing of known whitespaces, or may comprise analyzing signals received by wireless access point 106 to determine whether any channel of the spectrum is not in use at that time. As described above, the unused portions may be channels that have been licensed to an organization and may carry information at some time in the future, or may comprise identifying whitespace between assigned channels. In block 304, the wireless access point 106 may then determine any existing signals (either present at that time or that may be transmitted in the future) that could be disrupted by use of the unused portion of the spectrum. The determination may be made in any suitable manner.

In some implementations, determining type(s) of existing signals in block 304 may comprise consulting information on allocation of frequency channels in a spectrum. For example, the wireless access point 106 may have been provisioned with information regarding the assignment of channels to various organizations, and the signals that are transmitted by those organizations. By consulting the information, the wireless access point 106 may determine that the unused portion—or channels nearby the unused portions, such as in the case of whitespace—has been allocated for the transmission of specific signals, such as television signals. Accordingly, the existing signals may be determined to be those specific signals.

In alternative implementations, determining what types(s) of existing signals may be present in block 304 may comprise sensing the unused portion to detect whether there are any signals in the unused portion, or, in the case of whitespace, sensing nearby channels to determine whether there are signals in those channels. Any detected signals may then be analyzed by the wireless access point 106 to determine their type(s) and thus identify the existing signals. It should be appreciated that these techniques for determining what, if any, existing signals may be present in the channel are merely illustrative of techniques that may be implemented, as any suitable technique may be used.

In block 306, upon detecting existing signals in block 304, the destinations of the existing signals may be reviewed to determine how these destinations perform receipt procedures on received signals. A destination of an existing signal may be any device adapted to receive the existing signal and process it to extract and use the data therein. For example, a destination of a television signal may be a television, as the television is adapted to receive television signals via its antenna and use the data in the signal to present television images.

A destination of the existing signals will perform a receipt procedure on a received signal to yield its desired data. As discussed above, the receipt procedure may be performed based on various properties and parameters, and reviewing these properties and parameters may provide insight into how to develop a new signal that will not alter the data indicated by the receipt procedure. In this way, a new signal can be transmitted that is likely not to disrupt existing signals.

The properties and parameters of a destination's receipt procedure may be determined for review in block 306 in any suitable manner. In some cases, the properties and parameters of a destination of an existing signal may be inferred by the secondary user—the transmitter of the new signal—by analyzing existing signals that have been received by the secondary user. In other implementations, the properties and parameters may be known in advance according to one or more standards. For example, if the wireless access point 106 intends to transmit a new signal in whitespace of a portion of the licensed spectrum allocated to television signals of a certain type, the wireless access point 106 may be aware that the destinations will have receipt procedures that process received signals in accordance with those types. For example, in the United States television signals are transmitted according to the National Television System Committee (NTSC) or Advanced Television Systems Committee (ATSC) standards. A destination of television signals (e.g., a television), then, would perform a receipt procedure on received signals in accordance with the NTSC (or ATSC) standard. The wireless access point 106 may have information on the properties and parameters of the receipt procedures performed in accordance with NTSC, and thus when seeking to transmit new signals in whitespace of television channels may not have to query the destinations to get these values.

In block 308, based on the properties and parameters reviewed in block 306, a new signal may be developed for transmission that will not disrupt receipt of the existing signals. Developing a new signal may comprise any suitable action, including deriving a modulation scheme for the new signal or selecting a new signal from a set of pre-defined signals. This may be done in any of various ways, examples of which are described in greater detail below. In contrast to prior DAA approaches, processing at block 308 results in a new signal that may partially or totally overlap an existing signal. The overlapping new signal may overlap the existing signal in frequency, time, geography, or any other suitable characteristic. However, the new signal is developed such that when the new signal is processed by the destination of the existing signal, the new signal does not significantly change the data output from a receiver at the destination. By not substantially changing the data output at the destination, both the new signal and the existing signal can be transmitted in the channel and the existing signals can be received as if the new signal was not present at all. For existing signals transmitting digital data, the bits would be the same as would be received without the new signal being transmitted, or are similar enough that errors can be corrected using an error control code (ECC) or other error-handling technique. For existing signals transmitting analog data, the deviation in the signal will be within a threshold such that the change is imperceptible to the destination and any data processing carried out thereon. Accordingly, if the new signal is transmitted concurrently with an existing signal, the receiver will output, with an acceptable accuracy, the data in the existing signal. If the new signal is transmitted without an existing signal present (i.e., without a primary signal present), the receiver will not output information as if an existing signal were present. Thus, even when the new signal is transmitted in the same channel on which a destination is expecting to receive a primary/existing signal, the new signal will impact operation of the destination.

Once the new signal is produced in block 308, then in block 310 any suitable transmission parameters for the new signal, such as a modulation scheme for the new signal, may be communicated to the destination of the new signal—in the example of FIG. 1, the computing device 108—such that the destination of the new signal is aware of how to receive and process the new signal. This transmission may be made in any suitable manner. In the example of FIG. 1, this may be done by communicating the modulation scheme and transmission parameters to the destination via a channel known to both the wireless access point 106 and the computing device 108 as an initialization channel by which they can exchange data regarding another channel to use and the parameters to use on that channel without disrupting any traffic in the channel. For example, the initialization channel may be a channel in the unlicensed radio spectrum by which the wireless access point 106 and computing device 108 may negotiate use of a channel in the licensed radio spectrum. In alternative implementations, the initialization channel may be a channel of the licensed spectrum allocated by an administrative agency such as the FCC for transmission of initialization data regarding use of other channels, may be a channel known to be unused, or may be any other suitable channel of the radio spectrum.

In block 312, once the modulation scheme and any other transmission parameters have been communicated to the destination, then the wireless access point 106 and computing device 108 may begin communicating on the portion of the radio spectrum that was selected in block 302. Though one way communication from wireless access point 106 to computing device 108 is described, it should be appreciated that once a new signal is produced, one, two, or more devices may use it to carry out communication and communications may be originated by any of the devices using the new signal.

Figure 4:
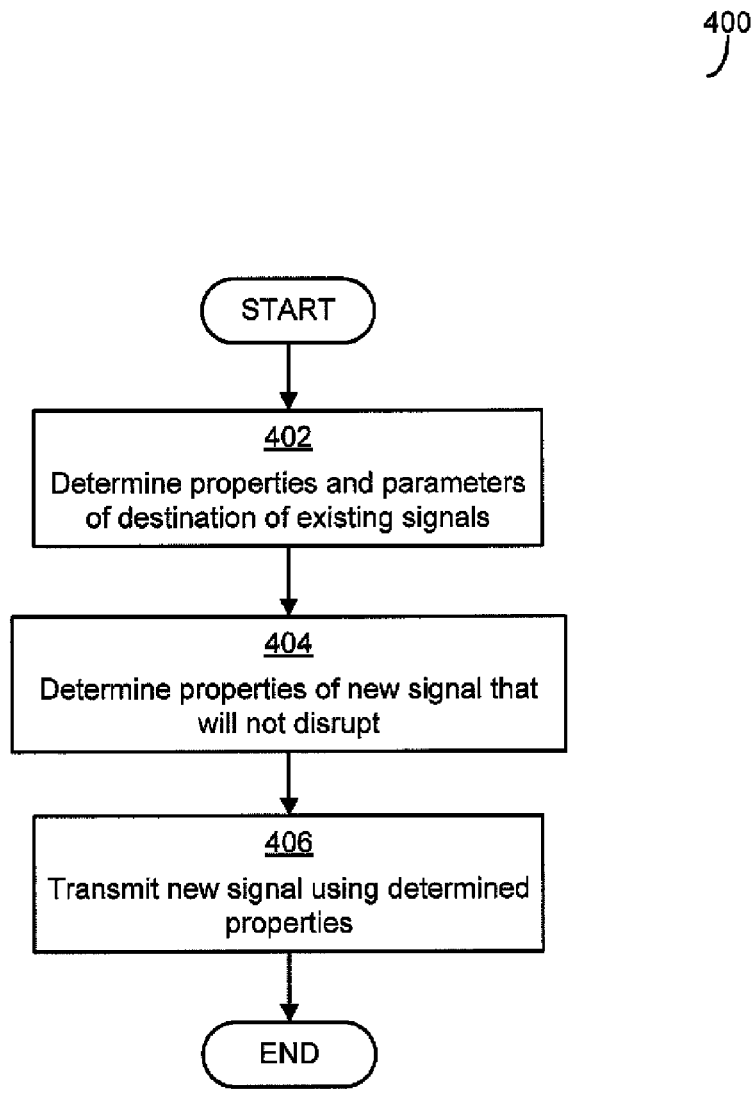
FIG. 4 is a flowchart of a process for determining a modulation scheme by which data may be transmitted in a new signal that will not disrupt receipt of one or more existing signals, that may be implemented in accordance with some of the principles described herein.

FIG. 4 shows a flowchart of an illustrative technique for designing a new signal that will not disrupt receipt of an existing signal. It should be appreciated that the process 400 shown in FIG. 4 is merely one example of the various techniques that may be implemented in accordance with some of the principles described herein, and that any suitable technique may be used. Further, as above, while FIG. 4 may be described in the context of the environment illustrated in FIG. 1, it should be appreciated that the technique is not limited to operating in such an environment and that any suitable environment may be used.

Process 400 begins in block 402, in which the wireless access point 106 reviews the properties and parameters of a destination of existing signals in a portion of the radio spectrum. The properties and parameters may be determined in any suitable manner, including by any of the techniques described above in connection with block 306 of FIG. 3. In this example, processing at block 402 reviews the properties and parameters of a receipt procedure of the destination. As described above in connection with block 306 of FIG. 3, the properties and parameters may be determined by retrieving them from a data store of information about existing signals, may be determined directly, or may be inferred by sampling an existing signal. From these properties and parameters, it may be possible, in block 404, to determine the properties of a new signal that will not be recognized and processed by the receipt procedure and thus not disrupt receipt of the existing signals at the destination.

Processing in block 404 may be performed at any suitable time. For example, a new signal may be developed dynamically after an existing signal is sensed. Alternatively, a new signal may be developed based on expected properties of an existing signal. Properties of such a signal may be stored and used once such a signal is detected. As another alternative, properties for a set of new signals may be developed and stored and a new signal from this set may be dynamically selected.

Determining, in block 404, properties of a new signal that will not disrupt receipt of the existing signals may be done in any suitable manner. For example, some receipt procedures may comprise an integration function, such as Equation 1, performed on an existing, received signal r(t) across the bit time T to determine the value of a bit encoded in a desired, existing signal.

$$B = \int_{t=0}^{t=T} r(t)dt \quad (1)$$

When designing a new signal s(t) to be transmitted concurrent with an existing signal without disrupting receipt of the existing signals, the new signal should be designed to have a low impact across the integration shown in Equation 1. Equation 2 shows such a desired relationship.

$$\min_{s(t)} \int_{t=0}^{t=T} r(t)s(t)dt \quad (2)$$

A new signal s(t) resulting in a small or minimal value of Equation 2 will have a negligible impact on the receipt procedures performed at the destination, and data in such a signal will likely not be recognized or processed by the destination. One or more constraints may be applied in producing a signal that minimizes Equation 2. For example, to achieve the relationship desired in Equation 2, the new signal s(t) may have to fit the constraint s(t)=0 outside of the range (0,T]. Further, because a new signal may require a certain power level to reach its destination, the new signal s(t) may need to fit the constraint on average energy level expressed in Equation 3.

$$E = \frac{1}{T} \int_{t=0}^{t=T} |s(t)|^2 dt \quad (3)$$

A new signal may be developed that satisfies Equation 2, subject to the various constraints. This may be done in any suitable manner, including known optimization technique(s). The optimization techniques may output properties for a new signal that fit the various constraints, and these properties may be used to transmit a new signal. It should be appreciated, however, that use of optimization techniques is only exemplary of the various ways in which a new signal may be designed according to the various constraints, and other techniques are possible.

In an alternative implementation, in block 404 the properties and parameters of the destination and the existing signals may be analyzed and a new signal s(t) designed that has a low enough correlation with the existing signals r(t) to be below a certain threshold $\epsilon$. The threshold may be determined, for example, as a value that provides an allowable rate of bit errors at the destination of the existing signals. For example, the allowable bit rate may be set at 1 error for every 100 bits transmitted (i.e., a bit rate of $\frac{1}{100}$). In this embodiment, a signal s(t) may be produced by solving for a value of s(t) that satisfies Equation 4 and any additional constraints.

$$\int_{t=0}^{t=T} r(t)s(t)dt < \varepsilon \quad (4)$$

Producing a signal s(t) that satisfies Equation 4 may be done in any suitable manner, examples of which are discussed in greater detail below. In some embodiments, the signal r(t) may be determined by measurement. However, it should also be appreciated that, as discussed above, the existing signal r(t) may not be detected by a secondary user. In some such implementations, the signal r(t) analyzed in FIG. 4 may be produced according to information known about the structure of existing signals transmitted in a channel, such as known information about the structure of television transmissions.

It should be appreciated that these techniques for determining properties of a new signal are merely illustrative of the various techniques that may be used to design a new signal, and that embodiments of the invention are not limited to designing a new signal in any particular manner.

Once the properties of the new signal are determined in block 404, then in block 406 the new signal may be produced according to the determined properties and transmitted, and the process 400 ends.

Figure 5:
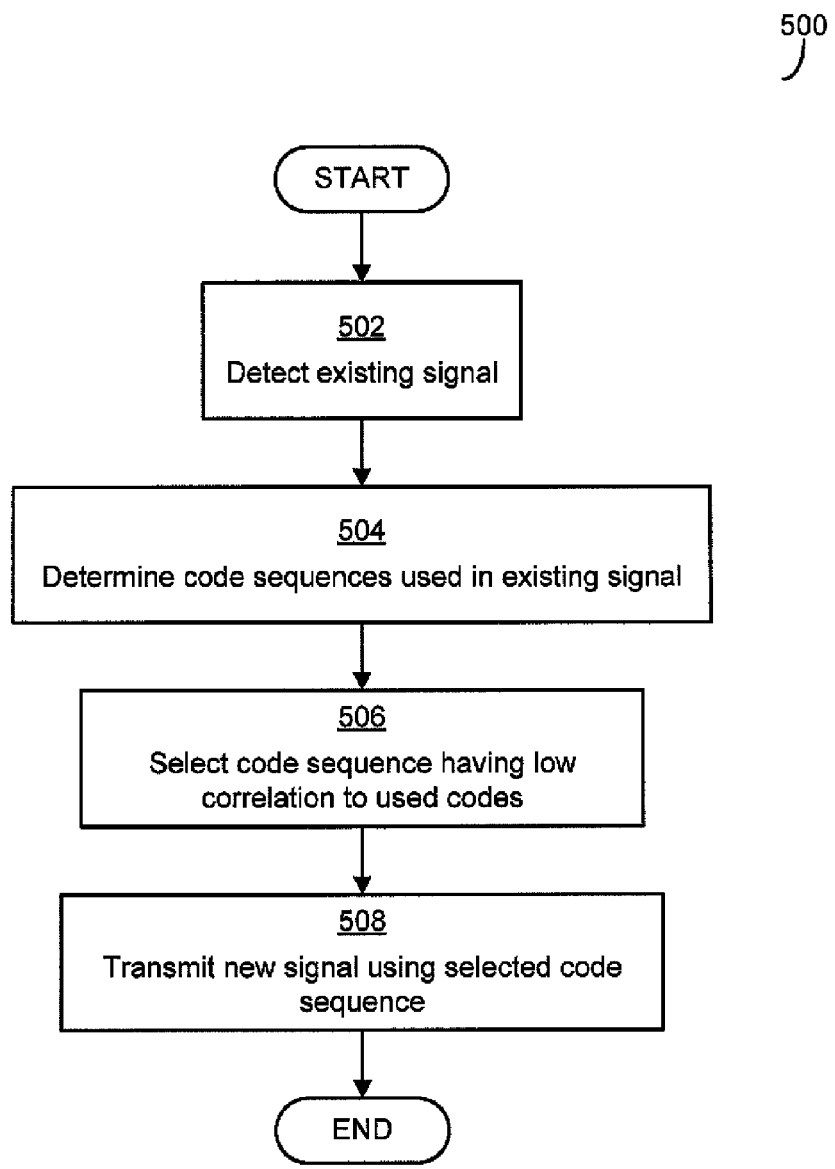
FIG. 5 is a flowchart of an illustrative process for selecting a code sequence by which to transmit new signals without disrupting receipt of existing signals, that may be implemented in accordance with some of the principles described herein.

FIG. 5 shows an example of how the above equations may be applied to produce a new signal in some embodiments such that the new signal will not disrupt receipt of existing signals in an environment in which the existing signal is transmitted using a code sequence. It should be appreciated, however, that the invention is not limited to implementing this or any other technique described herein, as embodiments of the invention may design a signal in any suitable manner.

In the example of FIG. 5, signals—including both existing signals and new signals—may be transmitted using various code sequences. These code sequences may be used to modulate the data onto a carrier signal, and may be used to distinguish signals from one another when receiving and decoding transmissions. For example, the code sequences may be M Sequences or Gold Sequences. When a signal that was encoded using a code sequence is received, the receiver decodes the signal using the code sequence and is thereby capable of removing from consideration other received signals that are not the desired signal. Techniques for transmitting signals using M Sequences (also known as Maximum Length Sequences (MLS)) and Gold Sequences are known in related arts, such as for transmitting data in the Code Division Multiple Access (CDMA) protocol. Such known techniques may be used to transmit signals herein, though any suitable code signals may be employed.

The process 500 of FIG. 5 begins in block 502, in which an existing signal that may be present in a channel is detected. As discussed above, detecting an existing signal that may be present in a channel may be performed in any suitable manner, including any of the techniques described above in connection with block 304 of FIG. 3.

In block 504, the existing signals are analyzed to determine which code sequences may be used to transmit data via the existing signals. This may be done in any suitable manner. For example, actual existing signals may be parsed and analyzed to determine the codes used by these existing signals. Alternatively or additionally, information on known codes used by existing signals may be reviewed to determine codes that may be used by existing signals. Codes may be assigned to particular transmitters, such as commercial broadcasters, and these codes may be known by other transmitting devices, or a range of codes may be assigned for particular purposes such that new transmitters may be able to determine that at least some of the range of codes may be used by the existing signals.

In block 506, once the code sequences used by the existing signals are known, then a new code sequence may be derived that may be used as a modulation scheme for a new signal that will not disrupt receipt of existing signals. This may be done in any suitable manner. For example, if a full set of available code sequences can be identified, an unused sequence may be selected from the set. Additionally or alternatively, a code sequence that has low cross-correlation to any of the used code sequences may be identified, either computationally or experimentally by varying a code sequence until one with a low cross-correlation to all code sequences used in the existing signal is found. Cross-correlation between code sequences may be determined by comparing the bits used in the code sequences and their inverses. If there is perfect overlap of the code sequences or their negatives, then the cross-correlation will be 1; however, if there is at least a one-bit different between the code sequences or their negatives, then the cross-correlation may be close to zero (e.g., $-1/N$, where N is the length of the sequence in bits). Such a technique may be used in the case of M Sequences and similar code sequences.

For other sequences, including Gold Sequences, other techniques may be used for selecting a code sequence. For example, if the existing signals are two signals $f_1(t)$ and $f_2(t)$ that are transmitted using a first and second Gold Sequence, then a transmitter seeking to derive a Gold Sequence as a modulation scheme to use for a new signal that will not disrupt receipt of the existing signals may select two signals $f_3(t)$ and $f_4(t)$ such that the correlations between each signals is low or zero. Such a desired relationship is shown in Equations 5-8.

$$\int [\cos(2\pi f_1(t))] \cdot [\cos(2\pi f_3(t))] dt = 0 \quad (5)$$

$$\int [\cos(2\pi f_2(t))] \cdot [\cos(2\pi f_3(t))] dt = 0 \quad (6)$$

$$\int [\cos(2\pi f_1(t))] \cdot [\cos(2\pi f_4(t))] dt = 0 \quad (7)$$

$$\int [\cos(2\pi f_2(t))] \cdot [\cos(2\pi f_4(t))] dt = 0 \quad (8)$$

By selecting the Gold Sequences to have a low correlation in this manner, according to the Equations 5-8, a modulation scheme for a new signal may be selected that may have reduced or no disruption on receipt of existing signals.

Once a modulation scheme is selected in block 506, then in block 508 a new signal may be transmitted using the selected code sequence, and the process 500 ends.

Some of the above illustrative techniques, described in connection with block 404 of FIG. 4, for determining properties of a new signal that will not disrupt receipt of an existing signal were described as producing a new signal. In some implementations, the new signal may be transmitted or received in fully configurable radios in devices such as wireless access point 106. In some embodiments, a configurable radio may be implemented as a Software-Defined Radio (SDR) that has full control over the manner in which signals are designed and transmitted. In such embodiments, producing a new signal may comprise designing a new signal to be transmitted. In other radios, however, software may control only a portion or none of the functions of the radio, and the remaining functions may be pre-defined in hardware. In some such implementations, a radio, such as the wireless access point 106 of FIG. 1, may have available to it a set of predetermined signal characteristics that may be varied to produce the new signal. The types of signal that can be produced or received may be regarded as further constraints on the new signal. For example, a radio in a computing device may be configured, under software control, to communicate using one of a predefined number of signal constellations made up of a set of sub-signals each representing a symbol of one or more bits. A correlation analysis may be performed between the known sub-signals representing symbols used to transmit a signal by a primary user and sets of the sub-signals in the predefined signal constellations.

A set of sub-signals may be identified that provides a low correlation with the primary signal. This set may be used to produce the new signal. Because the set is derived from the predefined constellations supported by the computing device, the computing device may produce the new signal, even if it does not have a fully configurable radio.

Figure 6A:
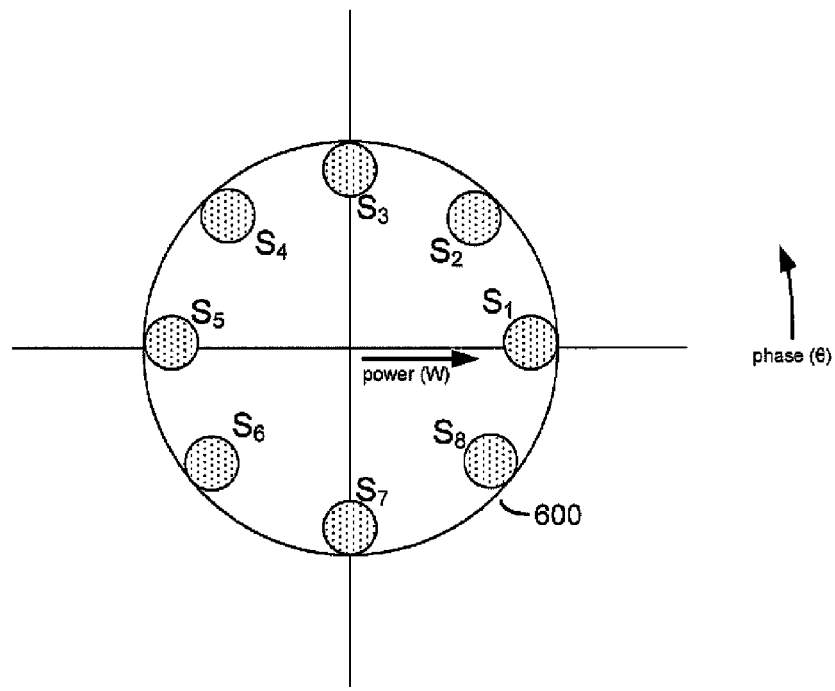
FIGS. 6A and 6B are sketches illustrating two exemplary constellations that may be available to a conventional computing device.
Figure 6B:
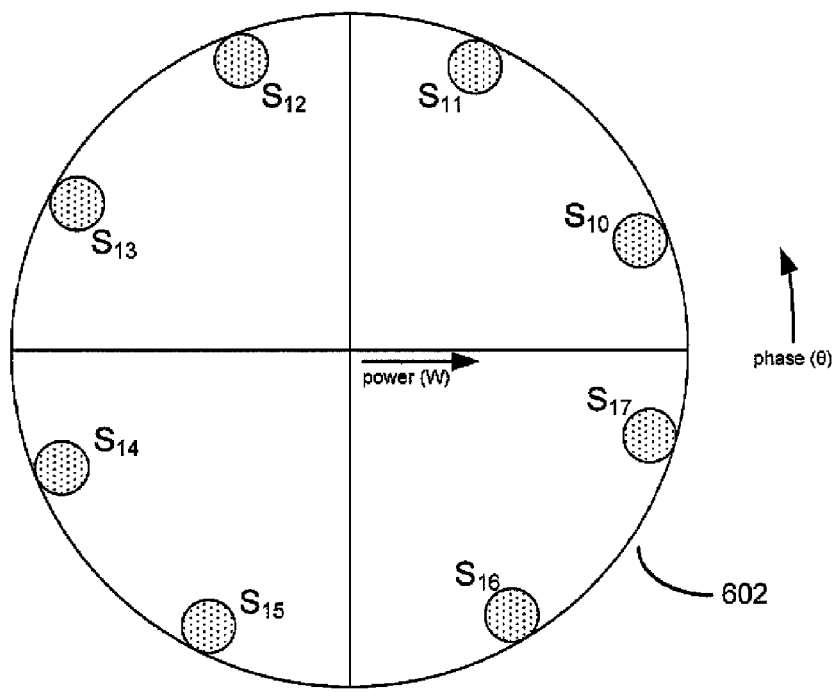

For example, FIGS. 6A and 6B show constellation diagrams for two different modulation schemes that may be implemented by a radio operating in accordance with some of the principles described herein. The two modulation schemes are shown as a first, lower-power modulation scheme 600 and a second, higher-power modulation scheme 602. Each of the two modulation schemes has eight symbols: $S_1$-$S_8$ for the first modulation scheme 600 and $S_{10}$-$S_{17}$ for the second modulation scheme 602. A conventional radio may select one or the other of constellations 600 or 602 for transmitting a signal.

In some implementations of the principles described herein, it is not a requirement that the new signal be produced based on a single existing constellation. A set of symbols in a new constellation may be derived by selecting symbols from different constellations supported by the computing device, and switching between the constellations on a symbol-by-symbol basis as the new signal is transmitted. For example, a new signal may be transmitted using a derived modulation scheme based on a derived constellation of signals. These signals may be selected from one, two or more of the predefined constellations supported by a computing device. When a new signal is to be transmitted according to the derived modulation scheme, then the signal may be transmitted using radio components (e.g., radio hardware) associated with the particular constellation from which the symbol was selected for the derived modulation scheme.

Figure 6C:
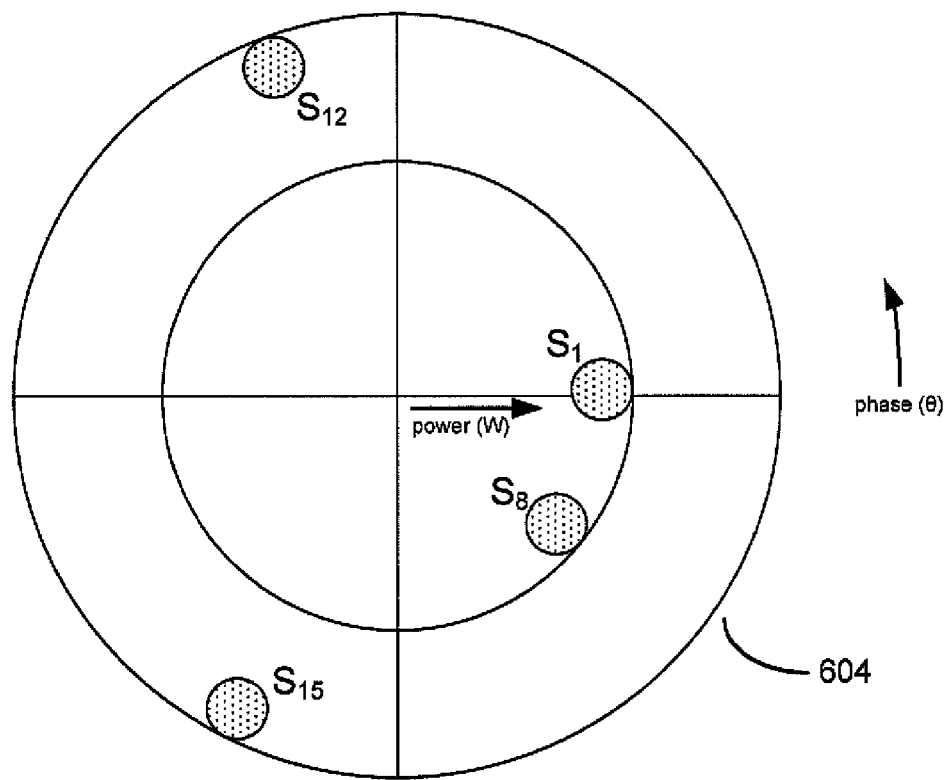
FIG. 6C is a sketch illustrating a derived constellation with symbols that have been selected from the constellations shown in FIGS. 6A and 6B for use in a derived modulation scheme by which data may be transmitted in a new signal that will not disrupt receipt of one or more existing signals.

An example of such a derived modulation scheme is shown in the constellation diagram of FIG. 6C. The derived modulation scheme 604 is shown comprising symbols from the modulation schemes 600 and 602 of FIGS. 6A and 6B, including symbols $S_1$ and $S_8$ from the first modulation scheme 600 and symbols $S_{12}$ and $S_{15}$ from the second modulation scheme 602. These four symbols have varying power and phase values, and the new signal will be modulated according to these symbols in the constellation. A new signal that reduces disruption of existing signals can then be transmitted using the symbols of the derived constellation of FIG. 6C.

Selection of symbols to be included in a derived constellation may be based on an adaptation of Equation 2 above. In this form of Equation 2, a new signal and the existing signal are represented by sets of symbols that, when transmitted, constitute sub-signals.

In one implementation, each symbol of an existing signal is transmitted as a sub-signal $r_i(t)$, i=1, . . . n, in the interval t=(0,T] and each symbol of a new signal may be transmitted as a sub-signal $s_j(t)$, j=1, . . . m. A new signal may be produced by selecting a set of symbols for the new signal that minimally disrupts the set of sub-signals for the existing signal.

Symbol to symbol disruption may be expressed as:

$$C_{i,j} = \int_{t=0}^{t=T} r_i(t) \cdot s_j(t) dt \qquad (9)$$

Accordingly, a new signal may be determined to minimize, or at least provide a suitably small value of the expression:

$$\min_{s_j(t), j=1, \ldots, m} \sum_{i=1}^{n} \sum_{j=1}^{m} W_{i,j}(C_{i,j}) \qquad (10)$$

where $W_{ij}$ is a weighting function. $W_{ij}$ may, in some implementations, simply be a uniform weighting function, but may, in alternative implementations, be a non-linear function to minimize the total number of symbols of the existing signal disrupted by the new signal, rather than a total amount of disruption. In still other implementations, $W_{ij}$ may be alternatively or additionally be a weighting function based on probability of each symbol occurring, or based on any other suitable factor.

Figure 7A:
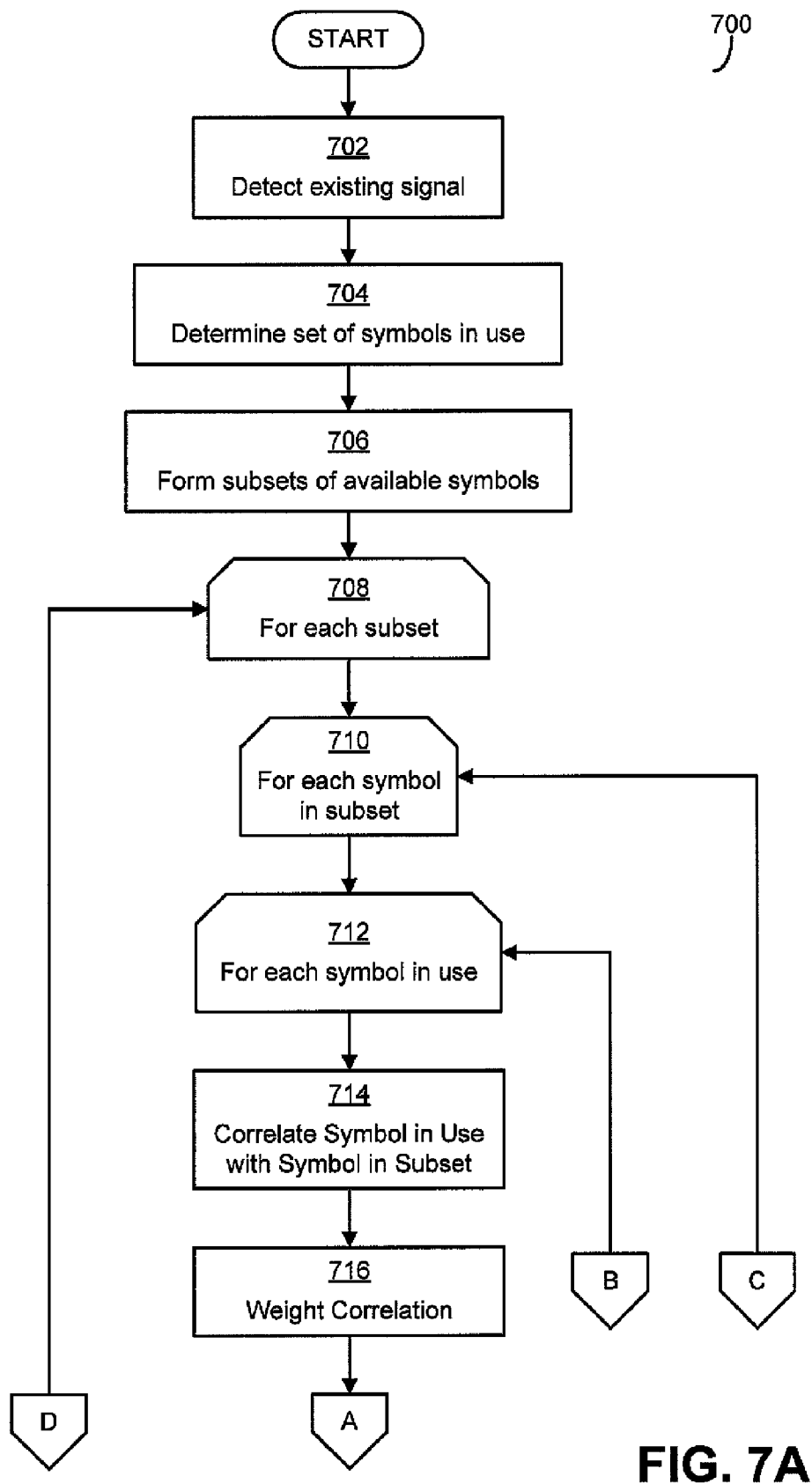
FIGS. 7A and 7B are a flowchart of an illustrative process for deriving a modulation scheme that will not disrupt receipt of an existing signal at the destination or interfere with operation of equipment at the destination, that may be implemented in accordance with some of the principles described herein.
Figure 7B:
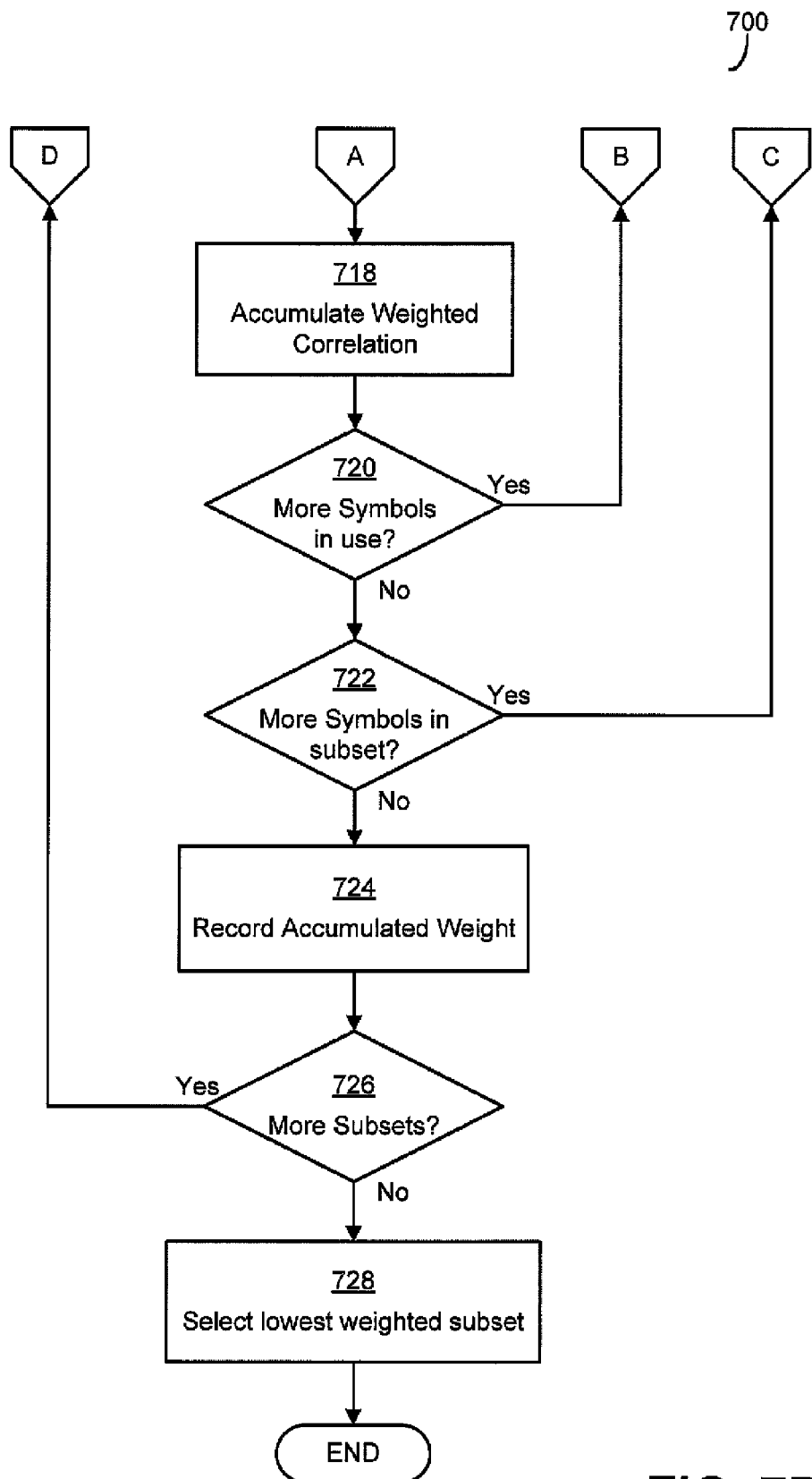

FIGS. 7A and 7B together show one example of a technique that may be used for selecting symbols to include in the derived modulation scheme, though it should be appreciated that it is only illustrative of the types of techniques that may be implemented in accordance with the principles described herein.

The process 700 of FIGS. 7A and 7B begins in block 702, in which an existing signal in a portion of a frequency spectrum is detected. In block 704, the set of symbols used to transmit data on the existing signal is determined. As above, detection and determination in blocks 702 and 704 may be performed in any suitable manner. For example, signals present in the portion of the spectrum at the time process 700 is carried out may be detected and the symbols used by them determined through examining the type and/or structure of the signals. Additionally or alternatively, the detection and determination of blocks 702 and 704 may be performed by reviewing information about allocation of the portion and the type and structure of the signals intended to be broadcast therein. For example, information on the portion of the spectrum may indicate that at least some of the portion has been allocated for use in transmitting television content using one or more modulation schemes.

In block 706, the process 700 forms one or more subsets of symbols that are available for use in producing a new signal. These symbols may be associated with one or more predefined constellations of symbols, and the subsets that are formed in block 706 may each be a predefined constellation. In other implementations, the subsets formed in block 706 may comprise every permutation of the available symbols, such that every available combination of the symbols may be examined by the process 700 to determine the lowest-correlated set of available symbols. In some implementations, the subsets of the available symbols may be of any size, while in other implementations the subsets may be ones of a minimum and/or maximum size (e.g., no less than four symbols and/or no more than eight symbols) or subject to other constraints.

Beginning in block 708, the process 700 initiates several loops to find a set of signals with low correlation with the existing signal. That process correlates each of the symbols in each of the subsets formed in block 706 to each of the symbols of the set of symbols used by the existing signal detected in block 702. In block 708, the process 700 selects the first subset of the one or more subsets formed in block 706 and, in block 710, selects the first symbol of the selected first subset. In block 712, a first symbol of the set of symbols used by the existing signal is selected.

In block 714, the selected first symbol of the selected first subset is correlated with the selected first symbol of the set of symbols used by the existing signal. The correlation of block 714 may be performed in any suitable manner, including according to any of the exemplary techniques and equations described above. In block 716, the correlation determined in block 714 may be weighted according to any suitable weighting function, and in block 718, the weighted correlation of block 716 may be accumulated with any previous weighted correlations for the subset selected in block 708. In this way, a separate value, representing a correlation for the subset, may be computed for each subset.

The process 700 then loops through each of the symbols in use by the existing signal. In block 720, it is determined whether more symbols exist, that have not been selected and examined in block 712, in the set of symbols in use by the existing signal. If so, then the process 700 returns to block 712 and a new symbol is selected and correlated with the presently-selected symbol of the presently-selected subset (i.e., the symbol last selected in block 710 and the subset last selected in block 708) in block 714. The correlation of block 714 is then weighted and accumulated with other weighted correlations for the subset selected in block 708.

When every symbol in the subset in use by the existing signal has been compared to the symbol selected in block 710 (i.e., when it is determined in block 720 that no more unselected symbols remain in the set of symbols in use by the existing signals), the process 700 loops through each of the symbols available in the subset selected in block 708. In block 722 it is determined whether more, unselected symbols exist in the subset selected in block 708. If so, then the process 700 returns to block 710 and selects a new symbol from the subset. The loop beginning in block 712 is then restarted, and the symbol newly-selected in block 710 is correlated and weighted against each of the symbols in the set of symbols in use by the existing subset, and the weighted correlation accumulated in block 718.

When every symbol in the subset selected in block 708 has been compared to every symbol in use by the existing signal (i.e., when it is determined in block 722 that no more unselected symbols remain in the subset selected in block 708) then in block 724 the accumulated weight of the subset may be recorded. The accumulated weight may be any function of the weighted correlations calculated in block 716 and accumulated in block 718, and may represent the overall correlation between a subset available for the new signal and the subset in use by the existing signal.

As discussed above, in some implementations the goal of processes like process 700 is to determine a set of symbols available to produce the new signal that has the lowest correlation to the set of symbols in use by the existing signal, and thus the lowest chance of disrupting communication of data using the existing signal. Accordingly, in block 726 it is determined whether there are more unselected subsets remaining in the set of subsets formed in block 706. If so, then the process 700 returns to block 708 and selects a new subset to be analyzed. The loops of block 710 and 712 are then restarted, and each symbol of the new subset is compared to each symbol of the set of symbols in use by the existing subset. The accumulated weighted correlations of each of the subsets is then recorded in block 724, such that there is recorded a complete listing of the weighted correlations between the available subsets and the set of symbols in use by the existing signal.

When it is determined in block 726 that all available subsets have been examined by process 700, then in block 728 the accumulated weighted correlations are examined and the subset with the lowest accumulated weighted correlation is selected for use as the new signal, and the process ends. The subset of symbols with the lowest weighted correlation is the one that has the lowest chance of disrupting the existing signals, and data transmitted using that subset has the lowest chance of being recognized and processed as data by destinations of the existing signals. The symbols of the subset selected in block 728 are then used to transmit data on the new signal.

Techniques operating according to some or all of the embodiments described herein may be implemented in any suitable manner. For example, in some embodiments, the techniques may be implemented as computer-executable instructions encoded on one or more computer-readable storage media such as magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. The computer-readable storage media may be implemented as computer-readable storage media 806 of FIG. 8 (i.e., as a portion of a computing device 800) or as a separate computer storage medium. It should be appreciated that, as used herein, a "computer-readable medium," including "computer-readable storage medium," refers to tangible storage media having at least one physical property that may be altered in some way during a process of recording data thereon. For example, a magnetization state of a portion of a physical structure of a computer-readable medium may be altered during a recording process.

In some such embodiments, the computer-executable instructions implementing the techniques operating in accordance with the principles described herein may be implemented as one or more stand-alone functional facilities (e.g., the replication facility described above). As described above, a "functional facility" is a structural component of a system which performs a specific operational role, however instantiated, which may be a portion of or an entire software element (e.g., a function or a discrete process). Generally, functional facilities include routines, programs, objects, components, data structures, etc. that perform particular tasks or implement particular abstract data types. Typically the functionality of the functional facilities may be combined or distributed as desired in various embodiments. These functional facilities may, in some implementations, be adapted to interact with other, unrelated functional facilities and/or processes, such as functional facilities implementing a software program application or implementing an operating system for a computing device, or, in other implementations, the modules may be adapted to interact with other functional facilities which, together with the modules, form an overall system such as an operating system, including the Windows operating system, available from the Microsoft Corporation of Redmond, Wash. In other words, in some implementations, the functional facilities may be implemented alternatively as a portion of or outside of an operating system. It should also be appreciated that, in some implementations, some functional facilities may be implemented separately from others, or some functional facilities may not be implemented.

In some, but not all implementations, the techniques may be embodied as computer-executable instructions that may be executed on any suitable computing device(s) operating in any suitable computer system, including the exemplary computer system of FIG. 1. These computer-executable instructions may be implemented in any suitable manner, including as a number of functional facilities, each providing one or more operations needed to complete execution of such techniques. Each functional facility may be implemented in its own way; all need not be implemented the same way. As used herein, a functional facility is a structural component of a system that performs an operational role. The operational role may be a portion of or an entire software element. For example, a functional facility may perform a function of a process, a discrete process, or any other suitable unit of processing. A functional facility may comprise computer-executable instructions, and, as discussed further below, may be encoded on one or more computer-readable storage media. Additionally, such computer-executable instructions may be written using any of a number of suitable programming languages and/or programming or scripting tools, and also may be compiled as executable machine language code or intermediate code that is executed on a framework or virtual machine. Functional facilities may be executed in parallel or serially, as appropriate, and may pass information between one another using a shared memory on the computer on which they are executing, using a message passing protocol or in any other suitable way.

Exemplary functional facilities are described herein for carrying out one or more tasks, though it should be appreciated that the functional facilities and division of tasks described is merely illustrative of the type of functional facilities that may implement the exemplary techniques described herein, and that the invention is not limited to being implemented in any specific number, division, or type of functional facilities. In some implementations, all functionality may be implemented in a single functional facility.

These functional facilities may operate on a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more application-specifics integrated circuits (ASICs) for carrying out the techniques described herein, one or more Field-Programmable Gate Arrays (FPGAs) for carrying out the techniques described herein, or any other suitable system.

Figure 8:
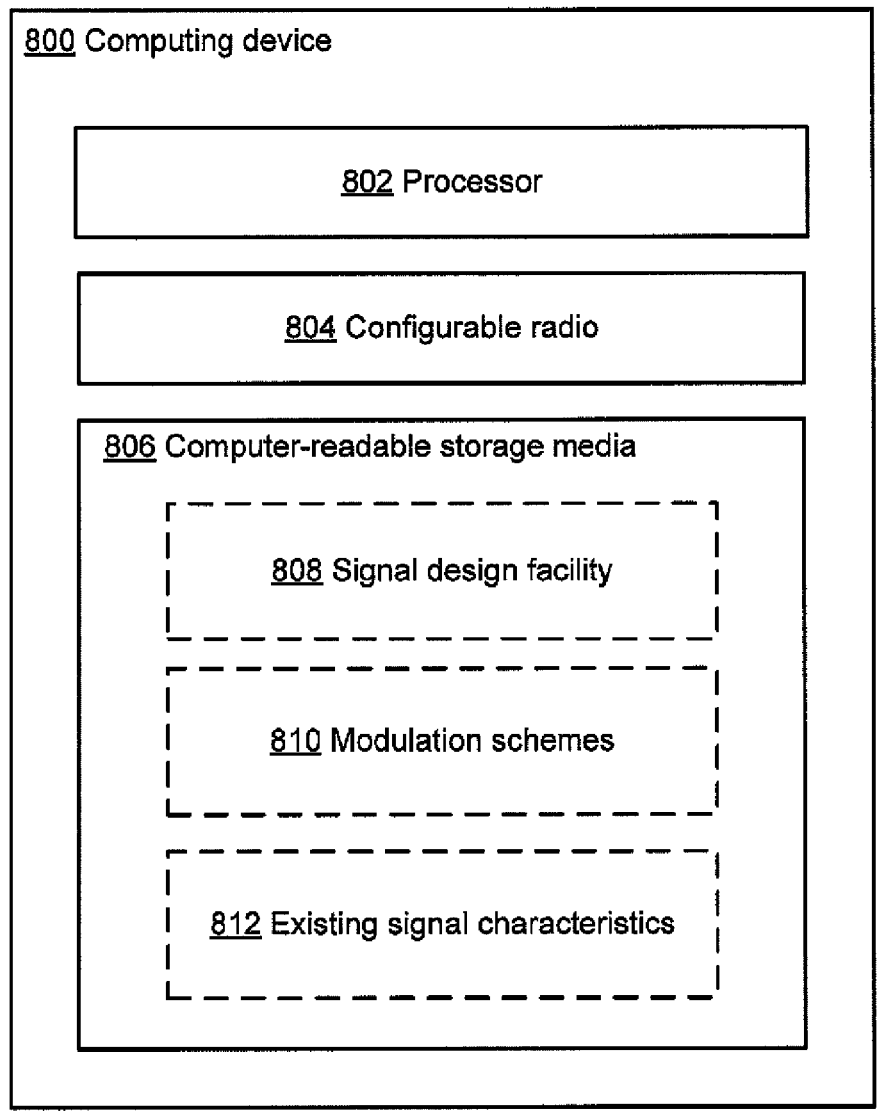
FIG. 8 is a block diagram of one exemplary computing device that may transmit new signals that do not disrupt receipt of one or more existing signals in accordance with some of the principles described herein.

FIG. 8 illustrates one exemplary implementation of a computing device in the form of a computing device 800 that may be used in a system implementing the techniques described herein, although others are possible. Further, it should be appreciated that FIG. 8 is intended neither to be a depiction of necessary components for a computing device to operate in accordance with the principles described herein, nor a comprehensive depiction.

Computing device 800 may comprise at least one processor 802, a configurable radio 804, and computer-readable storage media 806. Computing device 800 may be, for example, a desktop or laptop personal computer, a personal digital assistant (PDA), a smart mobile phone, a server, a wireless access point or other networking element, or any other suitable computing device. Configurable radio 804 may be any suitable hardware and/or software to enable the computing device 800 to communicate wirelessly with any other suitable computing device over any suitable computing network. The computing network may include a wireless access point as well as any suitable wired and/or wireless communication medium or media for exchanging data between two or more computers, including the Internet. An example of a configurable radio is described in greater detail below in connection with FIG. 9. Computer-readable media 806 may be adapted to store data to be processed and/or instructions to be executed by processor 802. Processor 802 enables processing of data and execution of instructions. The data and instructions may be stored on the computer-readable storage media 806 and may, for example, enable communication between components of the computing device 800.

The data and instructions stored on computer-readable storage media 806 may comprise computer-executable instructions implementing techniques which operate according to the principles described herein. In the example of FIG. 8, computer-readable storage media 806 stores computer-executable instructions implementing various facilities and storing various information as described above. Computer-readable storage media 806 stores a signal design facility 808. Signal design facility may be adapted to carry out any suitable signal design processes in any suitable manner, including by any of the exemplary techniques described above. In some embodiments, the signal design facility 808 may be implemented to select a modulation scheme according to the modulation scheme selection techniques described above in connection with FIGS. 5, 6A, 6B, and 7, and in other embodiments the signal design facility 808 may be implemented to carry out a signal design process in any other manner. Computer-readable storage media 806 may further store a plurality of modulation schemes 810, each having a plurality of modulation symbols associated with pre-defined constellations and/or pre-defined signals and sub-signals. These modulation symbols may be used to derive a new modulation scheme by which data will be transmitted on a new signal via the configurable radio 804. The computer-readable storage media 806 may further comprise information on existing signal characteristics 812. The information on existing signal characteristics 812 may comprise any suitable information on existing signals that may be encountered by the computing device and analyzed to design a new signal. This information 812 may comprise any suitable information on signals themselves, such as code sequences; any suitable information on receipt procedures carried out by destinations of the existing signals, such as properties and parameters of the receipt procedures; and/or any suitable information on equipment that may be used by destinations of the existing signals. This information may be used by the signal design facility 808 to design a new signal that will not disrupt receipt of existing signals.

Figure 9:
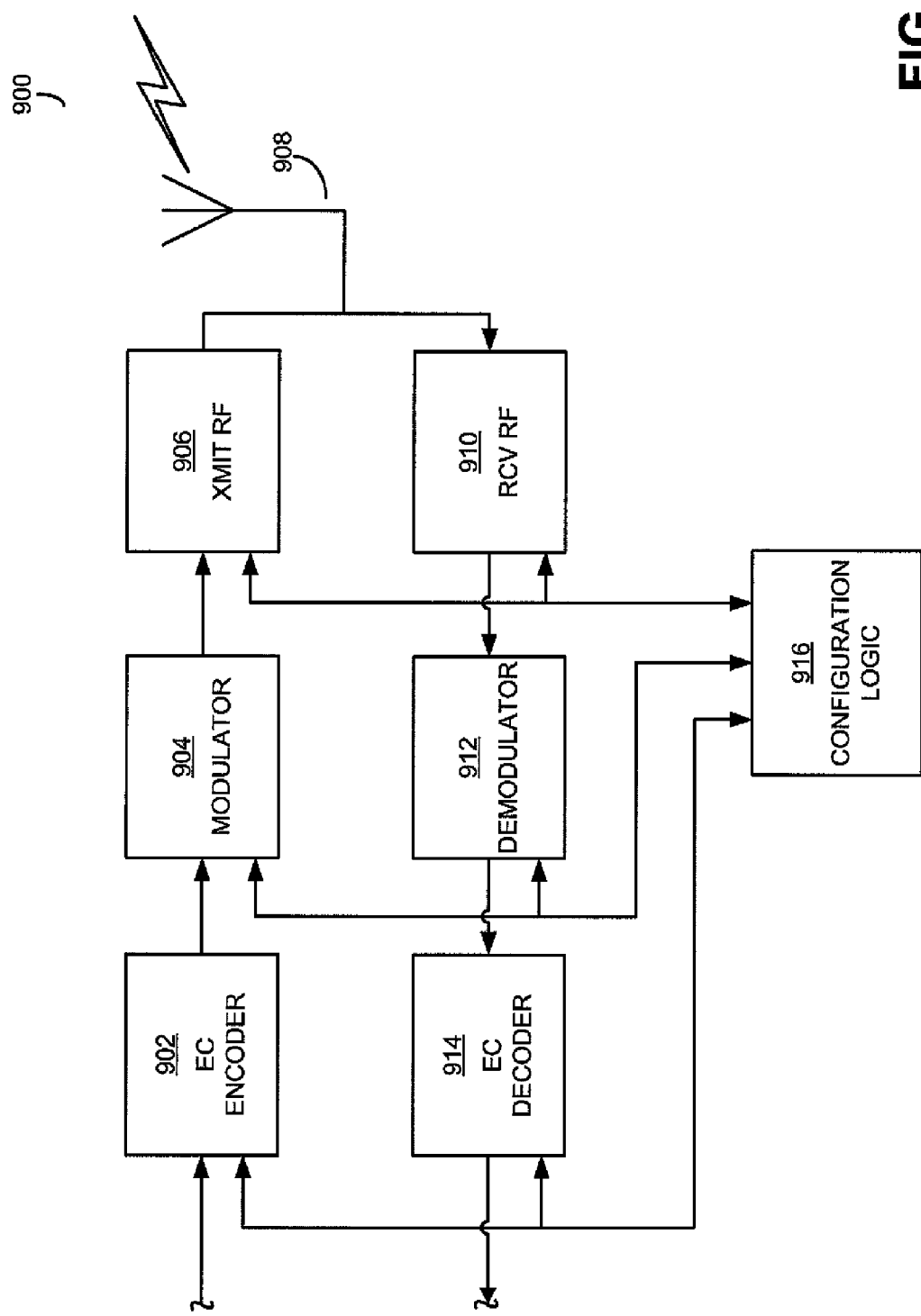
FIG. 9 is a block diagram of components of an exemplary radio system that may be implemented by a computing device.

Any suitable type of configurable radio may be implemented as a configurable radio 804 in accordance with the principles described herein, including a radio that is only partially configurable or one that is fully configurable such as a SDR. FIG. 9 shows a block diagram of one architecture for a configurable radio. It should be appreciated, however, that the configurable radio 900 shown in FIG. 9 is merely illustrated of the types of configurable radios that may be implemented in accordance with the principles described herein. Further, it should be appreciated that the block diagram of FIG. 9 is an abbreviated diagram, and that radios that are implemented in accordance with the architecture of FIG. 9 may further comprise any other suitable radio elements.

The block diagram of FIG. 9 shows two paths by which information may travel through the radio 900: an upper transmitter path and a lower receipt path. Both paths are connected to an antenna 908 by which signals may be transmitted and/or received. All elements of the path are connected to a configuration logic controller 916 by which the radio may be configured according to input from outside elements, such as from a user or a functional facility executing in a computing device of which the radio 900 is a part.

The upper transmit path of the radio 900 comprises an Error Control (EC) Encoder 902 by which an error control code (ECC) may be applied to data input to the transmit path from outside the radio. Data that has had an ECC applied may then be input to a modulator element 904 by which a modulation scheme is applied to the data. The modulator 904 may be configured by the configuration logic element 916 to apply a modulation scheme that has been derived in accordance with any of the exemplary techniques described above. The modulated data may then be passed to the radio frequency (RF) transmitter 906 to be applied to the antenna 908 and wirelessly transmitted. The RF transmitter 906 may be adapted to modify the modulated data in any way to design a new signal for transmission that may be transmitted without disrupting receipt of existing signals.

The lower transmit path of the radio 900 comprises an RF receiver 910 by which signals are received and processed. The RF receiver 910 may pass received data to a demodulator element 912. Together, the RE receiver 910 and demodulator 912 may perform a receipt procedure to obtain a desired signal from a received signal. This receipt procedure may be performed in any suitable way according to any suitable properties and parameters, and may be controlled by the configuration logic 916. Data that was included in the desired signal may be provided by the demodulator 912 to EC decode 914 such that any data errors and/or data losses may be detected and/or corrected. When any errors have been corrected, the data may then be supplied to elements outside the radio, such as a processor, memory, or other element.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method of operating a communication device to communicate as a secondary user in a portion of a frequency spectrum that may be used by a primary user to transmit a primary signal to convey data to one or more primary recipients, the method comprising:
   in response to receiving an indication of the primary signal, enabling communication with another device operating as a secondary user by:
      based on the indication of the primary signal, obtaining first indicators of respective individual primary modulation symbols of a primary modulation scheme of the primary signal,
      accessing second indicators of respective individual candidate modulation symbols in a pool of candidate modulation symbols,
      using the indicators of the primary and candidate modulation symbols to compute correlation values, with the primary modulation scheme, of respective subsets of the second indicators, and identifying a minimal one of the correlation values, wherein a correlation value for a given subset is computed by computing pairwise values of correlations for respective symbol pairs, any given symbol pair including a primary modulation symbol and a candidate modulation symbol in the given subset,
      constructing a secondary modulation scheme based on the modulation symbols in the given subset determined to have a minimal correlation value, the secondary modulation scheme being constructed for modulating a secondary signal for communication with the other communication device in a channel at least partly within the portion of the frequency spectrum,
   wherein the secondary modulation scheme is used to modulate the secondary signal to communicate with the other communication device.

2. The method of claim 1, wherein the candidate modulation symbols in the pool of candidate modulation symbols are selected from at least two of a plurality of modulation schemes.

3. The method of claim 2, further comprising:
   producing the secondary signal by encoding the data according to the derived secondary modulation scheme; and
   transmitting the secondary signal comprising the encoded data.

4. The method of claim 2, further comprising constructing the secondary modulation scheme such that the secondary signal will be substantially disregarded during decoding by one or more primary recipients of the at least one primary signal.

5. The method of claim 1, further comprising detecting the primary signal based on information on the communication device regarding properties of respective primary signals.

6. The method of claim 1, further comprising detecting the primary signal by detecting use of a second channel adjacent to the portion of frequency spectrum.

7. An apparatus comprising:
   a radio comprising a modulator, the modulator configurable to transmit in a channel of spectrum in accordance with a configurable modulation scheme;
   a controller for the radio, the controller adapted to, when the apparatus is operating:
   sense the presence of a primary signal in the channel, the primary signal being transmitted by a primary device of a user of a portion of the spectrum;
   responsive to sensing the primary signal, determine a primary modulation scheme for the primary signal, the primary modulation scheme comprising primary modulation symbols;
   use the primary modulation symbols to derive or select a secondary modulation scheme having secondary modulation symbols determined according to the primary modulation symbols to have a minimal correlation with the primary modulation symbols, wherein the determination of minimal correlation is made by computing individual correlations of respective pairs of modulation symbols, each pair including a primary modulation symbol and a secondary modulation symbol, wherein the determination is made such that a secondary signal carrying data encoded with the secondary modulation scheme is received by primary devices communicating via the primary signal; and
   configure the radio to communicate secondary signals with the selected secondary modulation scheme, the communicating the secondary signals comprising exchanging data with another apparatus, the secondary signals carrying the data exchanged between the apparatus and the other apparatus.

8. The apparatus of claim 7, wherein selecting or deriving the secondary modulation scheme comprises:
   selecting secondary modulation symbols for the secondary modulation scheme according to respective individual correlations of the selected secondary modulation symbols.

9. The apparatus of claim 7, further comprising:
   selecting a secondary code sequence by which to transmit data in the secondary signal, the secondary code sequence having a correlation, determined to be minimal according to the individual correlations, to a primary code sequence of the primary modulation scheme used to transmit data in the primary signal.

10. The apparatus of claim 7, wherein the radio is adapted to communicate according to at least a first predesigned signal and a second predesigned signal, and wherein configuring the radio to communicate a secondary signal with the secondary modulation scheme comprises configuring the radio to transmit a first symbol of the secondary signal according to the first predesigned signal and a second symbol of the secondary signal according to the second predesigned signal.

11. The apparatus of claim 7, wherein sensing the primary signal comprises sensing in a second channel adjacent to the channel.

12. The apparatus of claim 7, wherein the primary signal comprises a television signal being broadcast over a second channel adjacent to the channel, and the channel is whitespace between the second channel and a third channel.

13. An apparatus having encoded thereon computer-executable instructions that, when executed by a computer, cause the computer to carry out a method of operating a radio, the radio being adapted to be configured to operate in accordance with a plurality of encoding schemes, the plurality of encoding schemes comprising a first encoding scheme and a second encoding scheme, each encoding scheme corresponding to a respective constellation mapping a respective plurality of encoding scheme symbols to respective signal parameters, the method comprising:

defining a derived encoding scheme for a secondary signal, the derived encoding scheme comprising symbols individually selected from a pool of candidate symbols for encoding data during data communication between devices, wherein the symbols of the derived encoding scheme are selected from the pool of candidate symbols by evaluating correlations of features of the candidate symbols in different subsets of the candidate symbols with features of primary symbols to select a subset of the candidate symbols such that features of the symbols in the derived encoding scheme are determined to have a collective minima of correlation with features of the primary symbols, the derived encoding scheme including a symbol from the first encoding scheme and including a symbol from the second encoding scheme; and exchanging data with a device by transmitting the data encoded with the derived encoding scheme by changing the configuration of the radio to operate in accordance with the at least two of the plurality of encoding schemes as the information is being communicated.

14. An apparatus of claim 13, wherein deriving the derived encoding scheme comprises:

defining the derived encoding scheme such that the secondary signal transmitted in accordance with the derived encoding scheme will be substantially disregarded by a receipt procedure of a destination of primary signals such that the secondary signal does not substantially disrupt the receipt procedure.

15. An apparatus of claim 13, the method further comprising changing the configuration of the radio to transmit a first symbol from the first encoding scheme and changing the configuration of the radio to transmit a second symbol from the second encoding scheme.

16. An apparatus of claim 15, wherein each of the first and second symbols comprises a phase-power pair defining a phase angle and a power with which a signal corresponding to the symbol will be generated.

17. A method according to claim 1, wherein the minimal one of the correlation values is identified by comparing the correlation values to a threshold value and selecting the minimal one of the correlation values responsive to determining that the minimal one of the correlation values satisfies the threshold value.

* * * * *